United States Patent
Smailus et al.

(10) Patent No.: US 9,235,783 B1
(45) Date of Patent: Jan. 12, 2016

(54) HIGHLIGHTING AN OBJECT IN A DISPLAY USING A HIGHLIGHT OBJECT

(75) Inventors: Thomas O. Smailus, Sammamish, WA (US); Lawrence S. Baum, Seattle, WA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 13/452,463

(22) Filed: Apr. 20, 2012

(51) Int. Cl.
*G06K 9/34* (2006.01)
*G06K 9/78* (2006.01)

(52) U.S. Cl.
CPC .................................... *G06K 9/78* (2013.01)

(58) Field of Classification Search
CPC ...... G09G 5/14; G09G 2340/10; G06T 11/60; G06T 15/503; G06F 17/30; G06F 17/3087; G06F 17/30241; G06F 17/30265; G06F 17/30716; G06F 17/30047; G06F 3/0484; G06F 8/71; G06F 9/443; Y02B 60/1267; Y02B 60/142; Y02B 60/144; Y02B 60/167; Y02B 60/183; Y02B 60/46
USPC .......................................................... 345/629
See application file for complete search history.

(56) References Cited

U.S. PATENT DOCUMENTS

| | | | |
|---|---|---|---|
| 6,606,731 B1 | 8/2003 | Baum et al. | |
| 6,802,055 B2 | 10/2004 | Jade et al. | |
| 7,787,708 B2 | 8/2010 | Scheidhauer et al. | |
| 7,876,335 B1 | 1/2011 | Pittenger et al. | |
| 7,962,862 B2 | 6/2011 | Kulp et al. | |
| 7,971,194 B1* | 6/2011 | Gilboa | 717/136 |
| 2005/0134606 A1 | 6/2005 | Hong et al. | |
| 2007/0176944 A1* | 8/2007 | Brown et al. | 345/592 |
| 2007/0192739 A1* | 8/2007 | Hunleth et al. | 715/823 |
| 2008/0046845 A1 | 2/2008 | Chandra | |
| 2008/0163283 A1 | 7/2008 | Tan et al. | |
| 2009/0102837 A1 | 4/2009 | Kang et al. | |
| 2009/0183202 A1* | 7/2009 | Yoon et al. | 725/41 |
| 2009/0233705 A1* | 9/2009 | LeMay et al. | 463/25 |
| 2010/0085303 A1 | 4/2010 | Kwok et al. | |
| 2011/0096174 A1 | 4/2011 | King et al. | |
| 2011/0252315 A1* | 10/2011 | Misawa et al. | 715/256 |
| 2012/0008864 A1* | 1/2012 | Kanatsu et al. | 382/176 |
| 2012/0013621 A1 | 1/2012 | Ospina Gonzalez | |

OTHER PUBLICATIONS

Snagit-10-Help.pdf (Snagit Help Menu for Release 10.0, May 2010).*

(Continued)

*Primary Examiner* — Kee M Tung
*Assistant Examiner* — Yuehan Wang
(74) *Attorney, Agent, or Firm* — Toler Law Group, PC

(57) ABSTRACT

A particular method includes detecting an interaction event using an event capture object of a rendered display of a graphics file. The graphics file is rendered to generate the rendered display by layering one or more foreground objects over one or more background objects. The method also includes executing code associated with the graphics file in response to detecting the interaction event. The code is executed to determine an identifier of a highlight object based on an identifier of the event capture object. The highlight object is below the event capture object in the rendered display and may be below the object to be highlighted in the rendered display. The code is also executed to change an attribute of the highlight object to modify the rendered display.

20 Claims, 3 Drawing Sheets

(56) References Cited

OTHER PUBLICATIONS

SnagIt for Mac 20 Years Late, but Worth the Wait [Review]_Cult of Mac.pfd (SnagIt for Mac 20 Years Late, but Worth the Wait [Review], Dec. 10, 2010).*

SVG 1.1 (Second Edition)—Aug. 16, 2011.*

Scalable Vector Graphics (SVG) 1.1 (Second Edition), W3C Recommendation, Aug. 16, 2011, retrieved from the Internet at http://www.w3.org/TR/2011/REC-SVG11-20110816.

"Add/Remove Highlighting with the Keyboard", CyberText Newsletter, CyberText Consulting, retrieved from <http://cybertext.wordpress.com/2009/02/23/word-addremove-highlighting-with-the-keyboard>, Feb. 23, 2009, 8 pages.

* cited by examiner

HIGHLIGHTING AN OBJECT IN A DISPLAY USING A HIGHLIGHT OBJECT

FIELD OF THE DISCLOSURE

The present disclosure is generally related to highlighting an object in a display.

BACKGROUND

Some vector graphics techniques use a "painter model" for rendering. When using a painter model, objects are rendered one over another (in a manner that may be thought of as layering). For example, a first object is rendered, and then a subsequent object is rendered, possibly partially overlaying and possibly obscuring the first object. Objects may be defined in a graphics file in a manner that specifies the arrangement or order of the objects in a rendered display. For example, objects defined at the beginning of the graphics file may be rendered first (and are therefore at the back or lower layers of the rendered display) and objects at the end of the graphics file may be rendered last (and therefore at the front or upper layers of the rendered display).

In order to detect user events, a graphics file may include an event capture object. The event capture object may detect user interaction events, such as mouse over events. The event capture object may be used to highlight regions of a rendered display by triggering execution of code that causes the event capture object or another object to be modified in the rendered display. Methods of highlighting objects in a painter model rendered display can be less than satisfactory because the order in which the objects are layered in the rendered display can lead to highlighting that does not behave as users expect. Further, a graphics file that includes data to enable highlighting of objects in a rendered display can be very large as a result of the amount of data used to define multiple objects, to link the objects to enable highlighting, and to provide executable code to implement highlighting based on user events.

SUMMARY

A particular embodiment enables highlighting of graphical elements in a painter model rendered display by defining three objects in a graphics file for each "hotspot" (i.e., an area that is capable of being highlighted). The three objects include a highlight object on a lower layer, a display object (i.e., a graphic element, such as text, a line, an arc, a circle, a polygon, a bitmap object, another graphical shape, or a combination thereof, that is to be highlightable) in a middle layer, and an event capture object at an upper layer. The event capture object and the highlight object may have identical size and shape, and the event capture object may be as large as and covering the display object to be highlighted, to avoid display hysteresis. The highlight object and event capture object are constructed such that the highlight object can be found based upon the event capture object. For example, a naming convention may be used in which the highlight object has the same name as the event capture object with the addition of an affix (e.g., a suffix, a prefix or another identifiable portion).

In response to detecting an interaction event, software code may be executed. The software code may determine the name of the event capture object that detected the interaction event (since a large graphics file may have many such event capture objects) and may determine a name of a corresponding highlight object (e.g., a highlight object rendered below the event capture object in the rendered display) based on the name of the event capture object (e.g., by adding the affix to or removing the affix from the name of the event capture object). The software code may then modify the corresponding highlight object to highlight an object to be highlighted.

In a particular embodiment, a method includes detecting an interaction event using an event capture object of a rendered display of a graphics file, where the graphics file is rendered to generate the rendered display by layering one or more foreground objects over one or more background objects. The method also includes, in response to detecting the interaction event, executing code associated with the graphics file to determine an identifier of a highlight object based on an identifier of the event capture object and to change an attribute of the highlight object to modify the rendered display. The highlight object is below the event capture object in the rendered display, and below an object to be highlighted in the rendered display.

In another particular embodiment, an apparatus includes a memory storing code associated with a graphics file. The graphics file includes multiple event capture objects and multiple highlight objects, each highlight object corresponding to an event capture object. The apparatus also includes a processor coupled to the memory. The processor is configured to detect an interaction event associated with a particular event capture object at a rendered display of the graphics file, where the graphics file is rendered to generate the rendered display by layering one or more foreground objects over one or more background objects. The processor is also configured to execute the code associated with the graphics file in response to detecting the interaction event. The code is executed to determine an identifier of a particular highlight object corresponding to the particular event capture object based on an identifier of the particular event capture object and to change an attribute of the particular highlight object to modify the rendered display. The particular highlight object corresponding to the particular event capture object is below the particular event capture object in the rendered display.

In another embodiment, a tangible computer-readable storage medium includes processor-executable code that, when executed by a processor, causes the processor to perform a method. The method including detecting an interaction event associated with an event capture object at a rendered display of a graphics file, where the graphics file is rendered to generate the rendered display by layering one or more foreground objects over one or more background objects. The method also includes determining an identifier of a highlight object based on an identifier of the event capture object in response to detecting the interaction event. The highlight object is below the event capture object in the rendered display. The method further includes changing an attribute of the highlight object to modify the rendered display.

Particular embodiments use a generic portion of code and a naming convention to implicitly link highlight objects to event capture objects. The generic portion of code is able to select a highlight object that corresponds to an event capture object by computing the name of the highlight object based on the name of the event capture object and information regarding the naming convention. Accordingly, graphics files that use embodiments disclosed herein can be significantly smaller (i.e., use less memory) than graphics files that include data to explicitly link highlight objects to event capture objects. The particular embodiments also decouple the pointer event capturing and highlighting objects from the graphical feature that is to be highlighted, allowing the highlight object to be placed entirely behind the object or objects to be highlighted, and allowing the event capture object to be placed entirely in front of the object or objects to be highlighted. This arrangement avoids event hysteresis and allows the object or objects to be highlighted to be displayed as authored and intended while the highlighting can utilize the full display and color saturation capabilities of the display device.

The features, functions, and advantages that have been described can be achieved independently in various embodiments or may be combined in yet other embodiments, further details of which are disclosed with reference to the following description and drawings.

DETAILED DESCRIPTION

Figure 1:
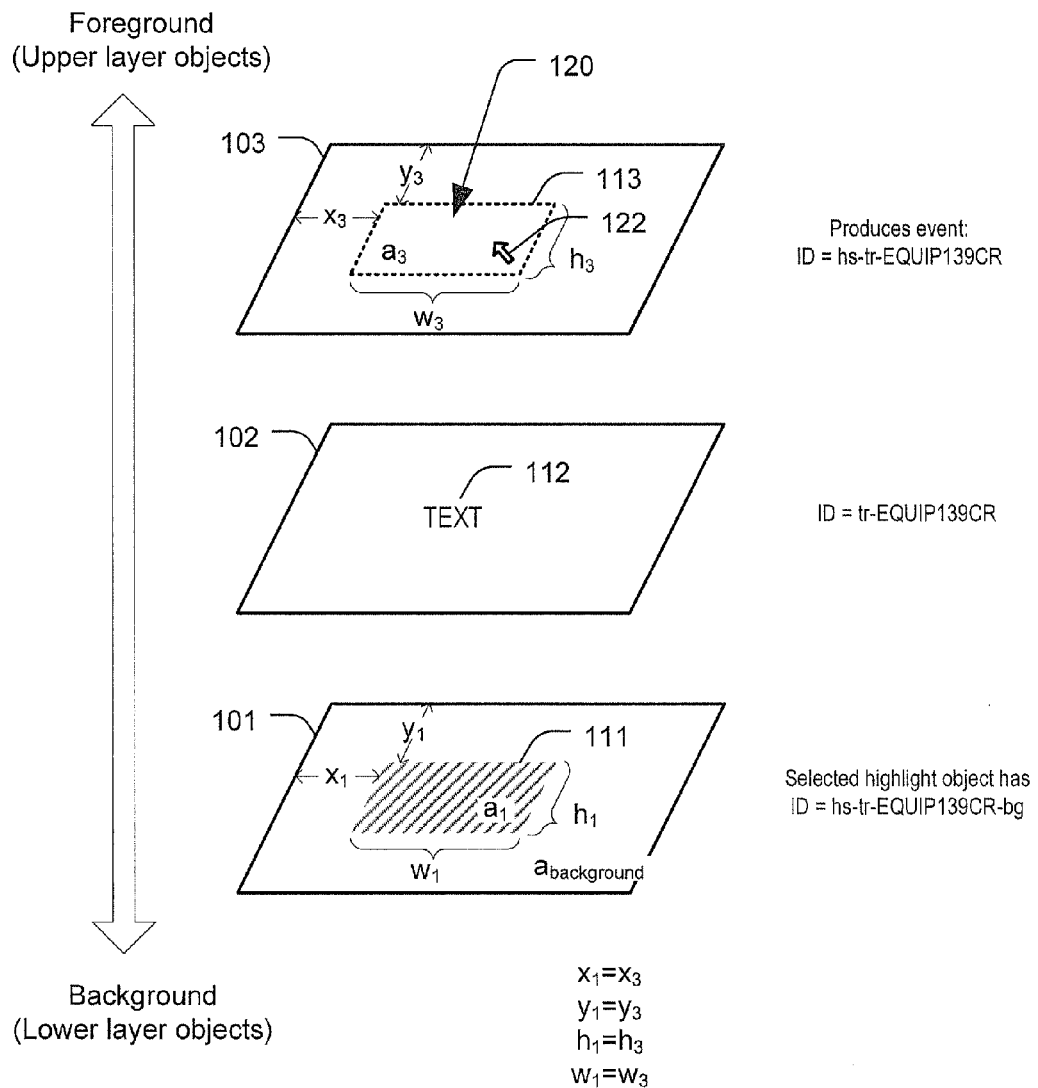
FIG. 1 shows a diagram illustrating layers of a rendered display according to a particular embodiment.

FIG. 1 shows a diagram illustrating layers of a rendered display according to a particular embodiment. In particular, FIG. 1 illustrates a first layer 101, a second layer 102 and a third layer 103. The layers 101-103 are shown merely to simplify the following description and are not intended to indicate that the methods of highlighting objects in a rendered display disclosed herein are limited to rendering models that use layers. Rather, the layers 101-103 are shown to illustrate a painter model of rendering, in which lower layer objects, such as objects associated with the first layer 101, are rendered before upper layer objects, such as objects associated with the third layer 103.

Scalable Vector Graphics (SVG) is an example of a graphics format that uses the painter model. In a painter model, objects may be rendered in the order that the objects are specified in a graphics file. Thus, a graphics file used to render the layers shown in FIG. 1 would include data defining an object of the first layer 101 before data defining an object of the second layer 102. Likewise, the graphics file would include data defining the object of the second layer 102 before data defining an object of the third layer 103. Thus, the object of the first layer 101 may be shown in a background of the rendered display, the object of the third layer 103 may be shown in a foreground of the rendered display, and the object of the second layer 102 may be between the foreground and the background. Accordingly, objects on the first layer 101, objects on the second layer 102, objects on the third layer 103 and possibly objects associated with one or more additional layers (such as layers before the first layer 101, other layers between the first layer 101 and the third layer 103, or layer above the third layer 103) may together form the rendered display.

FIG. 1 also shows a "hotspot" 120. A hotspot refers to a region with which a user can interact with the rendered display via an interaction event. For example, the hotspot 120 may be associated with a portion of text, a graphical element (e.g., a drawing element), another portion of a rendered display that is to be associated with interactive features, such as highlighting, or a combination thereof. The hotspot 120 includes a highlight object 111, an object to be highlighted (also referred to as a display object 112), and an event capture object 113. The event capture object 113 may be rendered at a top most layer of the rendered display and may be rendered with display attributes that enable viewing of the display object 112 and the highlight object 111 through the event capture object 113 (e.g., the event capture object 113 may not be visible in the rendered display). The event capture object 113 may include or be associated with code that enables the event capture object 113 to detect user interaction with the event capture object 113. For example, the event capture object 113 may include code that enables the event capture object 113 to detect when a pointer 122 controlled by the user enters the boundaries that specify the event capture object 113, referred to as a mouseover event. Examples of other interaction events that the event capture object 113 may be configured to detect include other events responsive to a pointing device, such as mouseout events, hover events, mouse click events, and double click events, and events responsive to a keyboard or other input device, such as keydown events and keyup events.

The graphics file may include multiple hotspots of which the hotspot 120 is a representative example. The graphics file may also include code (e.g., processor executable instructions) that uses information provided by a particular event capture object to identify the corresponding highlight object. Each of the hotspots of the graphics file may be associated with an event capture object, such as the event capture object 113, a highlightable display object, such as the display object 112, and a highlight object corresponding to the event capture object, such as the highlight object 111. A naming convention may be used to identify the objects (e.g., the event capture object, the display object and the highlight object) associated with a hotspot. The naming convention may enable an identifier of the highlight object to be determined (e.g., computed) based on an identifier of the corresponding event capture object. To illustrate, the display object may be named using the naming convention. Techniques for automatically identifying and naming objects in graphics files, such as technical drawings, using a naming convention are described in U.S. Pat. No. 6,606,731, which is expressly incorporated herein in its entirety for all purposes. After a name is applied to the display object, names may be applied to the event capture object and the highlight object corresponding to the name of the display object. The names applied to the event capture object and the highlight object may be derived from or determined based on the name applied to the display object.

Using the embodiment depicted in FIG. 1 as a representative example, the highlight object 111 may be positioned behind the display object 112 and the event capture object 113 may overlay the display object 112, as indicated by the following pseudo code of a portion of a graphics file defining the objects:

Graphics file excerpt:
-------------------------------
<!-Highlight Object (backGroundObj): (e.g., at line 347 of the graphics file)—drawn first and below the other objects->
<g id="hs-tr-EQUIP139CR-bg" visibility="hidden" class="textref-bg">
<rect x="16479" y="15250" width="675" height="119"/>
</g>
<!-Display object to be highlightable (Textref): (e.g., at line 832 of the graphics file)—diagram content to be interacted with (e.g., Text item to hotspot)->
<text id="T10" x="16479" y="15250">
<tspan id="tr-EQUIP139CR">1234ABC</tspan>
</text>
<!-Event Capture Object (hotspotObject): (e.g., at line 2313 of the graphics file)—object that reacts to/captures the interaction events (e.g., mouseover events)—drawn last and thus above the highlight object and the display object->
```
<g                          id="hs-tr-EQUIP139CR"
onmouseover="highlightTextref(evt)" fill="none"
class="textref">
<rect    x="16479"    y="15250"    width="675"
height="119"/>
</g>
```
In this pseudo code example, the display object 112 is associated with the identifier (or name) "tr-EQUIP139CR". The event capture object 113 is associated with the identifier "hs-tr-EQUIP139CR", which includes the prefix "hs-" added to the identifier of the display object 112. The highlight object 111 is associated with the identifier "hs-tr-EQUIP139CR-bg", which includes the suffix "-bg" added to the identifier of the event capture object 113.

The following pseudo code is an example of code that may be associated with or included in the graphics file to modify a rendered display of the graphics file responsive to a detected interaction event.

```
Code supporting interactivity:
Function: highlightTextref
//------------------------------
Function: highlightTextref
//Purpose: highlight a textref hotspot on mouse-over
//
function highlightTextref(evt){
var svgHotspotId=evt.target;
var hotspotObject=svgHotspotId.parentNode;  //hotspot parents are the identifier
  group
  var id=hotspotObject.getAttributeNS(null, "id");
  id=id+"-bg";
  var backGroundObj=document.getElementById(id);
  if (backGroundObj){
  backGroundObj.setAttributeNS(null, "visibility", "visible");
  }
}//end function highlight
```

Thus, when the event capture object 113 detects an interaction event, the event capture object 113 may initiate the "highlightTextref" function described in the pseudo code above. The identifier of the event capture object 113 may be provided to the highlightTextref function, which may use the identifier of the event capture object 113 to compute, determine or derive the identifier of the corresponding highlight object 111. For example, the highlightTextref function may add or concatenate "-bg" to the identifier of the event capture object 113 to determine the identifier of the corresponding highlight object 111. Rather than, or in addition to, using a prefix to identify an event capture object and a suffix to identify the corresponding highlight object, other affixes or combinations of affixes may be used to distinguish the event capture object from the highlight object. Examples of affixes that may be used include suffixes (e.g., "tr-EQUIP139CR-bg"), prefixes (e.g., "bg-tr-EQUIP139CR"), interfixes (e.g., "tr-bg-EQUIP139CR"), circumfixes (e.g., "b-tr-EQUIP139CR-g"), transfixes (e.g., "tr-EQUIP-b-139-g-CR"), simulfixes (e.g., "tr-BG139CR"), and disfixes (e.g., "tr-139CR"). Additionally or in the alternative, the naming convention may enable the identifier of the highlight object corresponding to a particular event capture object to be computed, derived or determined in some other manner than adding an affix. For example, an affix may be removed from the identifier of the event capture object. In another example, a numerical value may be computed (e.g., incremented) to determine the identifier of the corresponding highlight object based on the identifier of the event capture object. Using the naming convention enables relationships between display objects, highlight objects, event capture objects, or a combination thereof to be determined (e.g., to identify corresponding objects) without the objects being explicitly linked in code. Thus, a size of the graphics file may be reduced. Further, the naming convention enables automated processing of a file to add hotspots. For example, a file may be processed using the techniques described in U.S. Pat. No. 6,606,731 to automatically identify and name display objects, and an event capture object and a corresponding highlight object may be automatically generated for a display object and named using the naming convention.

After the corresponding highlight object 111 is selected, the highlightTextref function may modify an attribute, $a_1$, of the highlight object 111 in order to visually distinguish an area around or corresponding to the display object 112 from a remaining area of the rendered display. For example, the remaining area of the rendered display may have an attribute, $a_{background}$. The attribute $a_{background}$ may specify a color, a texture, an opacity, an intensity, a hue, a line type, a line width, a line color, fill pattern, a shading or another visual property that is used to render a portion of the rendered display. The attribute, $a_1$, of the highlight object may initially by the same (i.e., have the same value) as the attribute, $a_{background}$, of the remaining area of the rendered display. Thus, the highlight object 111 may be visually indistinguishable from the remaining area of the rendered display before the interaction event is detected. When the value of the attribute, $a_1$, of the highlight object 111 is modified, the highlight object 111 may be rendered in a manner that is visually distinct from the remaining area of the rendered display. For example, a color, a texture, an opacity, an intensity, a hue, a line type, a line width, a line color, fill pattern, a shading or another visual property of the highlight object 111 may be changed to make the highlight object 111 visually distinct. Additionally or in the alternative, the highlight object 111, the event capture object 113, or both, may be associated with code to perform other functions.

In a particular embodiment, the event capture object 113 overlays the highlight object 111. For example, the event capture object 113 may have dimensions, such as a width, w3, and a height, h3, that are equal to or greater than a width, w1, and a height, hl, of the highlight object 111. Additionally, the event capture object 113 may have a coordinate position in the rendered display, illustrated as (x3, y3) in FIG. 1, which is equal to a coordinate position in the rendered display of the highlight object 111, illustrated in FIG. 1 as (x1, y1). Positioning the event capture object 113 over the highlight object 111 and display object 112 avoids display hysteresis, where the area of the display modified in response to an event does not directly correspond to a location where the event was detected. Display hysteresis can be confusing to users. In a particular embodiment, the event capture object 113 completely covers the display object 112, and the display object 112 is rendered in front of the highlight object 111 so that the optical highlighting effect is clear and does not obscure a base diagram including the display object 112 by filtering or obscuring the display object 112.

Figure 2:
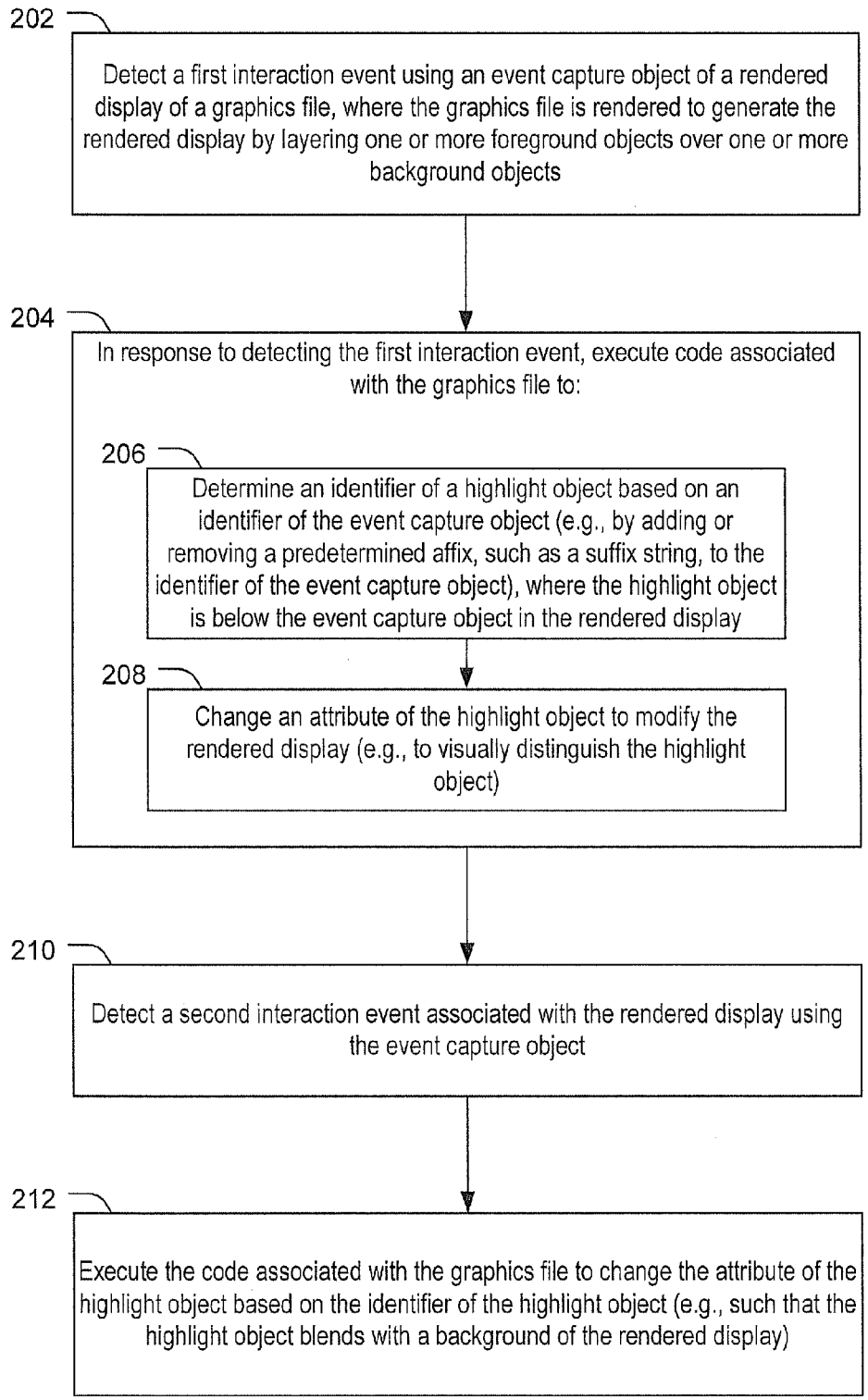
FIG. 2 shows a flow diagram illustrating a method for highlighting an object in a display according to a particular embodiment.

FIG. 2 shows a flow diagram illustrating a method for highlighting an object in a display according to a particular embodiment. The method of FIG. 2 may be executed by a computer system generating a rendered display of a graphics file, as described with reference to FIG. 1.

The method includes, at 202, detecting a first interaction event using an event capture object of a rendered display of a graphics file. The graphics file may be rendered to generate the rendered display by layering one or more foreground objects over one or more background objects. For example, the graphics file may be rendered using a painter model, as described with reference to FIG. 1.

At 204, code associated with the graphics file may be executed in response to detecting the first interaction event. The code may determine an identifier of a highlight object based on an identifier of the event capture object, where the highlight object is below the event capture object in the rendered display, at 206. For example, a naming convention may be used to name the event capture object and the corresponding highlight object. The naming convention may enable the identifier of the highlight object to be computed based on the identifier of the event capture object. To illustrate, the identifier of the highlight object may be computed by adding a predetermined affix to or removing a predetermined affix from the identifier of the event capture object. The predetermined affix may be a string (e.g., a suffix string such as "-bg"), a numeric value, or a combination thereof. The code may also change an attribute of the highlight object to modify the rendered display, at 208. For example, changing the attribute of the highlight object may cause the highlight object to be visually distinguished in the rendered display.

The method may also include, at 210, detecting a second interaction event associated with the rendered display using the event capture object. For example, the first interaction event may be a mouseover event indicating that a user has placed a pointer or cursor over an area of the rendered display corresponding to the event capture object, and the second interaction event may be a mouseaway event indicating that the user has moved the pointer or cursor away from the area corresponding to the event capture object. In response to detecting the second interaction event, the code associated with the graphics file may again be executed or other code may be executed to change the attribute of the highlight object based on the identifier of the event capture object, at 212. The attribute of the highlight object may be changed such that the highlight object blends with a background of the rendered display. To illustrate, in response to an event capture object detecting a first interaction event that is a mouseover event, a color (or other attribute) of the corresponding highlight object may be changed to highlight a display object that overlays the highlight object. When the user mouses away from the event capture object, the event capture object may generate a mouseaway event, and in response to the mouseaway event, the color (or other attribute) of the highlight object may be changed to cause the highlight object to blend with the background of the rendered display.

Thus, a display object of a painter model graphics file can be highlight enabled to provide interactive features without explicitly linking each event capture object to a corresponding highlight object and without providing code associated with each display object to implement highlighting. Further, use of a naming convention enables automatic processing of a file to produce a graphics file that includes the interactive features, significantly reducing time and expense associated with adding interactive features to complicated drawings, such as technical drawings.

Figure 3:
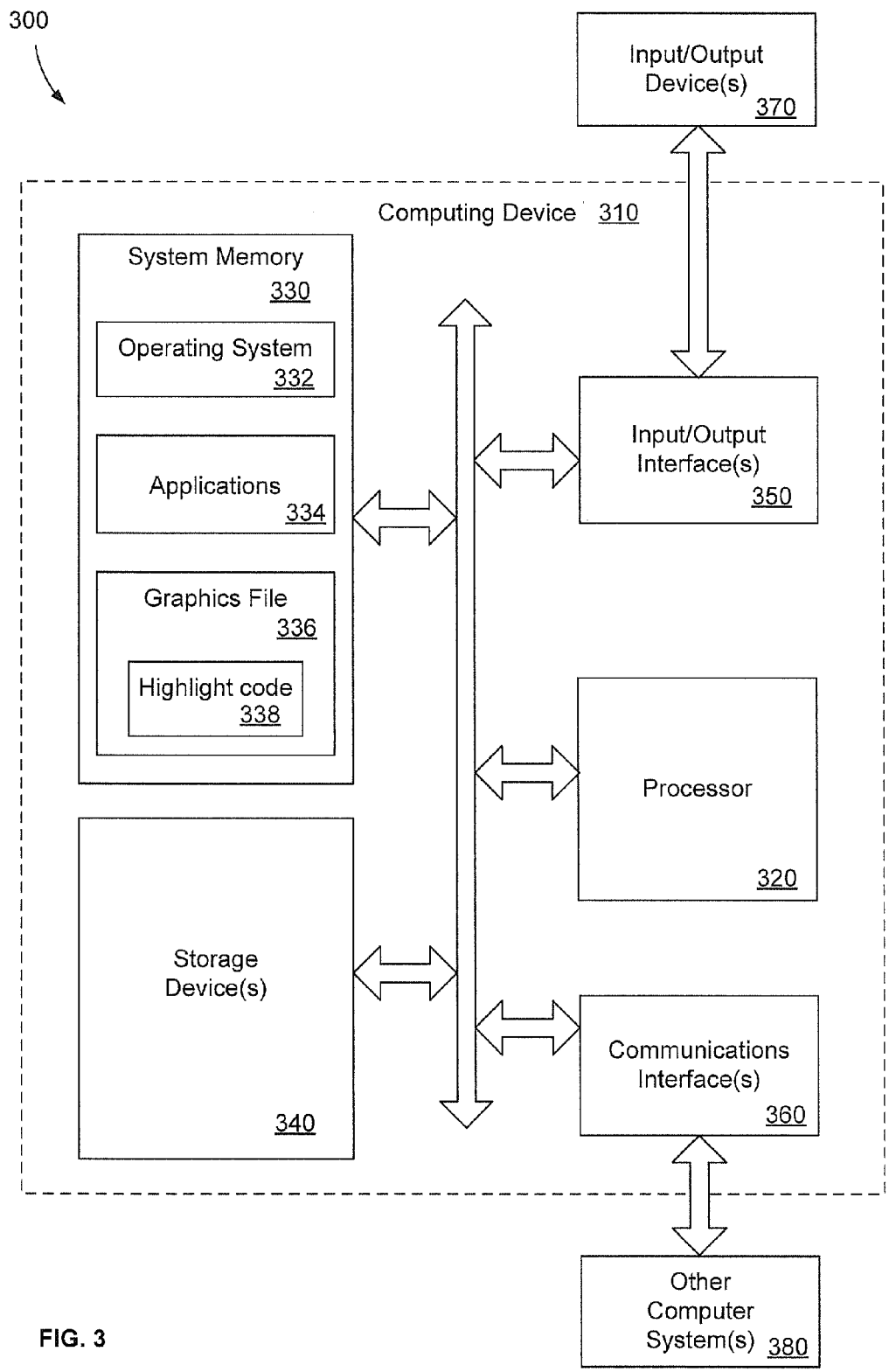
FIG. 3 is a block diagram of a computing environment operable to highlight an object in a display according to a particular embodiment.

FIG. 3 is a block diagram of a computing environment 300 including a general purpose computing device 310 operable to support embodiments of computer-implemented methods and computer-executable program instructions (or code) according to the present disclosure. For example, the computing device 310, or portions thereof, is operable to render a display of a graphics files using a painter model and to highlight an object in the rendered display. In another example, the computing device 310, or portions thereof, may automatically process a file to identify objects that are to be provided with interactive features, to name (or assign identifiers to) the objects, to generate corresponding event capture objects and highlight objects for each object that is to be provided interactive features, and to name (or assign identifiers to) the highlight objects and the event capture objects using a naming convention. The naming convention enables computing of an identifier of a particular highlight object based on an identifier of a particular event capture object that corresponds to the particular highlight object.

The computing device 310 may include at least one processor 320. Within the computing device 310, the at least one processor 320 may communicate with a system memory 330, one or more storage devices 340, one or more input/output interfaces 350, one or more communications interfaces 360, or a combination thereof.

The system memory 330 may include volatile memory devices (e.g., random access memory (RAM) devices), non-volatile memory devices (e.g., read-only memory (ROM) devices, programmable read-only memory, and flash memory), or both. The system memory 330 may include an operating system 332, which may include a basic/input output system for booting the computing device 310 as well as a full operating system to enable the computing device 310 to interact with users, other programs, and other devices. The system memory 330 also typically includes one or more application programs 334, such as a painter model rendering application, e.g., a an application that is able to render Scalable Vector Graphics (SVG)-compliant files or other painter model graphics files. The system memory 330 also may include one or more graphics files 336 which may include or be associated with highlight code 338. The highlight code 338 may be executable by the processor 320 to detect interaction events, to compute an identifier of a highlight object based on an identifier of an event capture object, to change an attribute of a highlight object, or a combination thereof.

The processor 320 may also communicate with one or more storage devices 340. For example, the one or more storage devices 340 may include nonvolatile storage devices, such as magnetic disks, optical disks, or flash memory devices. The storage devices 340 may include both removable and non-removable memory devices. The storage devices 340 may be configured to store an operating system, applications and program data. In a particular embodiment, the system memory 330, the storage devices 340, or both, include tangible, non-transitory computer-readable media.

The processor 320 may also communicate with one or more input/output interfaces 350 that enable the computing device 310 to communicate with one or more input/output devices 370 to facilitate user interaction. The input/output interfaces 350 may include serial interfaces (e.g., universal serial bus (USB) interfaces or IEEE 1394 interfaces), parallel interfaces, display adapters, audio adapters, and other interfaces. The input/output devices 370 may include keyboards, pointing devices, displays, speakers, microphones, touch screens, and other devices. The processor 320 may detect interaction events based on user input received via the input/output interfaces 350. Additionally, the processor 320 may send the rendered display to a display device via the input/output interfaces 350.

The processor 320 may communicate with other computer systems 380 via the one or more communications interfaces 360. The one or more communications interfaces 360 may include wired Ethernet interfaces, IEEE 802 wireless interfaces, Bluetooth communication interfaces, electrical, optical or radio frequency interface, or other network interfaces. The other computer systems 380 may include host computers, servers, workstations, and other computing devices.

Thus, particular embodiments disclosed herein use a generic portion of code and a name convention to implicitly link highlight objects to event capture objects. The generic portion of code is able to select a highlight object that corresponds to an event capture object by computing the name of the highlight object based on the name of the event capture object and information regarding the naming convention. Accordingly, graphics files that use embodiments disclosed herein can be significantly smaller (i.e., use less memory) than graphics files that include data to explicitly link highlight objects to event capture objects.

Embodiments described above illustrate but do not limit the disclosure. It should also be understood that numerous modifications and variations are possible in accordance with the principles of the present disclosure. Accordingly, the scope of the disclosure is defined only by the following claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
   detecting an interaction event using an event capture object of a rendered display of a graphics file, wherein the graphics file is rendered to generate the rendered display by layering one or more foreground objects over one or more background objects, and wherein the graphics file includes data defining a highlight object and an object to be highlighted;
   in response to detecting the interaction event, executing code associated with the graphics file to:
   determine a first identifier of the event capture object;
   dynamically generate a second identifier of the highlight object by modifying the first identifier, wherein the highlight object is in a first layer below the event capture object in the rendered display; and
   change an attribute of the highlight object to modify the rendered display, wherein the object to be highlighted is positioned in a second layer below the event capture object in the rendered display, wherein the second layer is positioned above the first layer in the rendered display, wherein the highlight object and the object to be highlighted overlap in a first region of the rendered display, and wherein the event capture object overlaps the first region.

2. The method of claim 1, wherein the highlight object has a same size, a same shape, and a same coordinate position as the event capture object, and wherein the object to be highlighted has a same size, a same shape, and a same coordinate position as the event capture object.

3. The method of claim 1, further comprising, in response to detecting the interaction event, executing code associated with the graphics file to select the highlight object from a set of highlight objects associated with the graphics file based on the second identifier.

4. The method of claim 1, wherein the one or more background objects include the highlight object and the one or more foreground objects include the object to be highlighted.

5. The method of claim 1, wherein executing the code associated with the graphics file to change the attribute of the highlight object causes the highlight object to visually distinguish an area in the first layer below the object to be highlighted relative to a remaining area of the rendered display.

6. The method of claim 5, wherein the object to be highlighted includes text, a graphical element, or both, and the highlight object visually distinguishes a second region around the text, the graphical element, or both, from the remaining area of the rendering display, and wherein the first regions overlaps the second region.

7. The method of claim 1, wherein changing the attribute of the highlight object changes a pattern, a texture, an opacity, an intensity, a hue, a line type, a line width, or shading of the highlight object in the rendered display.

8. The method of claim 1, wherein the interaction event includes at least one of a mouseover event or a mouse exit event.

9. The method of claim 1, further comprising:
   detecting a second interaction event associated with the rendered display using the event capture object; and
   executing the code associated with the graphics file to change the attribute of the highlight object based on the identifier of the highlight object, wherein the attribute is changed such that the highlight object blends with a background of the rendered display.

10. The method of claim 1, wherein the event capture object is a top most layer of the rendered display and wherein the highlight object is in a bottom most layer below the object to be highlighted.

11. An apparatus comprising:
    a memory storing code associated with a graphics file, the graphics file including data defining multiple event capture objects, multiple highlight objects, and multiple objects to be highlighted, each highlight object of the multiple highlight objects corresponding to a particular event capture object of the multiple event capture objects, and each object to be highlighted of the multiple objects to be highlighted corresponding to a particular highlight object of the multiple highlight objects, and a processor coupled to the memory, wherein the processor is configured to:
    detect an interaction event associated with a first event capture object of the multiple event capture objects at a rendered display of the graphics file, wherein the graphics file is rendered to generate the rendered display by layering one or more foreground objects over one or more background objects;
    in response to detecting the interaction event, executing the code associated with the graphics file to:
        determine a first identifier of the first event capture object;
        dynamically generate a second identifier of a first highlight object of the multiple highlight objects by modifying the first identifier, wherein the first highlight object is in a first layer below the first event capture object in the rendered display; and
        change an attribute of the first highlight object to modify the rendered display, wherein a first object to be highlighted of the multiple objects to be highlighted corresponding to the first highlight object is positioned in a second layer below the event capture object in the rendered display, wherein the second layer is positioned above the first layer in the rendered display, wherein the highlight object and the object to be highlighted overlap in a first region of the rendered display, and wherein the event capture object overlaps the first region.

12. The apparatus of claim 11, wherein the second identifier comprises the first identifier.

13. The apparatus of claim 12, wherein the predetermined affix is a suffix including a string that distinguishes the identifier of the first highlight object from the identifier of the first event capture object.

14. The apparatus of claim 11, wherein the identifier of the first highlight object is determined by removing a predetermined affix from the identifier of the event capture object.

15. The apparatus of claim 11, wherein the graphics file is rendered using a painter model approach to rendering.

16. The apparatus of claim 11, wherein changing the attribute of the first highlight object causes the first highlight object to be visually distinguished relative to a remaining area of the rendered display.

17. A non-transitory computer-readable storage medium comprising processor-executable code that, when executed by a processor, causes the processor to perform operations comprising:
    detecting an interaction event associated with an event capture object at a rendered display of a graphics file, wherein the graphics file is rendered to generate the rendered display by layering one or more foreground objects over one or more background objects, and wherein the graphics file includes data defining a highlight object and an object to be highlighted;
    in response to detecting the interaction event, determining a first identifier of the event capture object;
    in response to detecting the interaction event, dynamically generating a second identifier of the highlight object by modifying the first identifier, wherein the highlight object is in a first layer below the event capture object in the rendered display; and
    in response to detecting the interaction event, changing an attribute of the highlight object to modify the rendered display, wherein the object to be highlighted is positioned in a second layer below the event capture object in the rendered display, wherein the second layer is positioned above the first layer in the rendered display, wherein the highlight object and the object to be highlighted overlap in a first region of the rendered display, and wherein the event capture object overlaps the first region.

18. The non-transitory computer-readable storage medium of claim 17, wherein the graphics file is a Scalable Vector Graphic (SVG) compliant drawing file.

19. The non-transitory computer-readable storage medium of claim 17, wherein changing the attribute of the highlight object changes a color of the highlight object in the rendered display from a background color to a visually distinct color, and wherein the color of the highlight object is returned to the background color in response to detection of a second interaction event.

20. The non-transitory computer-readable storage medium of claim 17, wherein the event capture object is not visible in the rendered display.

\* \* \* \* \*